United States Patent Office 2,988,537
Patented June 13, 1961

2,988,537
ART AND COMPOSITION
Douglas W. Wiley, Wilmington, Del., assignor to E. I. du Pont de Nemours and Company, Wilmington, Del., a corporation of Delaware
No Drawing. Filed Oct. 21, 1958, Ser. No. 768,564
23 Claims. (Cl. 260—67)

This invention relates to novel fluorinated organic compounds and to their preparation.

Hanford, in U.S. Patent 2,411,158, discloses that when a compound of the formula $X_2C=CX_2$, wherein all the X's are fluorine, e.g., tetrafluoroethylene, or one X is hydrogen or halogen, the other three being fluorine, is reacted with a saturated acid ester, aldehyde or ketone, the product is an ω-hydropolyfluorocarbonyl compound. Hanford's reaction is optionally accomplished in the presence of named catalysts, including alkali metal alkoxides.

It has now been found that different fluorinated compounds can be obtained when from one to two moles of a fluoroolefin of formula $CX_2=CX_2$, wherein the X's are halogen of atomic number 9 to 35, at least two being fluorine, is caused to react with one mole each of an alkali metal alkoxide and either a carbonic or other carboxylic acid ester, followed by acidification of the reaction mixture. Acidification of the reaction mixture yields the desired β-alkoxypolyfluorocarbonyl-containing compounds, which can be isolated by conventional techniques. Some of these β-alkoxypolyfluorocarbonyl compounds are new. In a slight variation of the procedure, it has been found that if an amide is substituted for the initial ester, novel aldehydes are produced in the subsequent acidification step.

An object of this invention is, accordingly, provision of a novel synthesis of β-alkoxypolyfluorocarboxylic acid esters and β-alkoxypolyfluoroaldehydes and ketones.

Another object is provision of novel β-alkoxypolyfluoroaldehydes and ketones of general formula $$ROCF_2CX_2COA$$

in which X is a halogen of atomic number 9 to 35, A is hydrogen, hydrocarbon, or fluorocarbon, and R is hydrocarbon or fluorocarbon.

Additional objects of the invention are provision of polymers of the novel β-alkoxypolyfluoroaldehydes and of methods for the preparation of the same.

General equations illustrating the monomeric aspects of the invention may be written as follows:

In the production of ketones, (1) 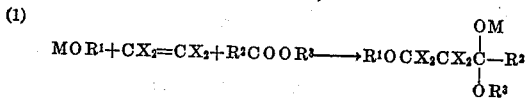

(2) 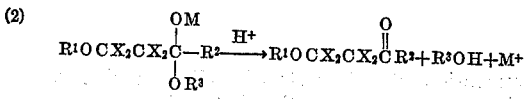

In the production of esters, (3) 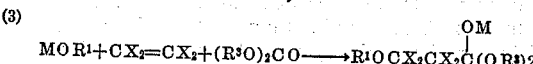

(4) 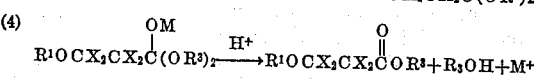

It has been found that this reaction can proceed further by reacting with a second equivalent of fluorinated olefin to produce ketones, (5) 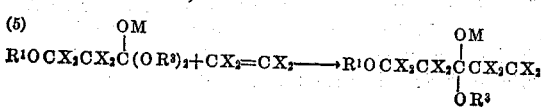

(6) 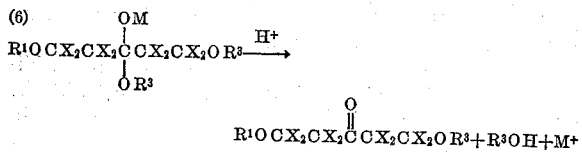

It will be understood that, where $R^1$ and $R^3$ differ, a mixture of the two possible products will be obtained.

In the production of aldehydes, (7) 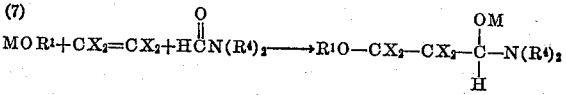

(8) 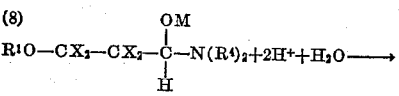
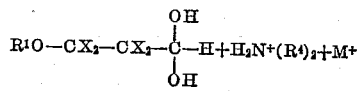

(9) 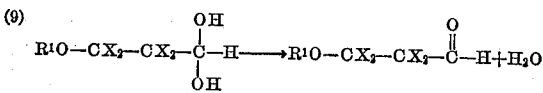

Here, of course, the $R^4$'s may be alike or different but, since they do not appear in the desired aldehyde final product, a difference is immaterial.

The symbols employed in the nine equations above may be defined as follows:

a. X is halogen, i.e., fluorine, chlorine, or bromine, but at least two of the X's in any halogenated olefin employed as a starting material are fluorine;

b. M is an alkali metal;

c. $R^1$ is an alkyl (including cycloalkyl) or fluorinated alkyl (cycloalkyl) group of up to 18 and generally not more than 7 carbon atoms. Among the preferred fluorinated groups are the polyfluorinated and α- and ω-hydropolyfluorinated alkyl groups;

d. $R^2$, derived from the acid moiety of the ester employed, may be defined in the same manner as $R^1$ except that, in general, it will possess no more than 12 carbons. In addition, it may be hydrogen, aromatic or arylaliphatic. It may also be the residue of a dicarboxylic acid, e.g., carbonic or oxalic;

e. $R^3$ is defined in the same manner as $R^1$; and f. $R^4$ is an alkyl or halogenated alkyl (including cycloalkyl) radical of up to 18 carbons.

It is preferred that, in any given synthesis, all the R's (except $R^4$'s) in the compounds employed be identical. Otherwise, a mixture of products will generally be obtained as noted.

In accomplishing the reactions of the equations given, the alkoxide and the selected ester or amide are mixed together, generally in an inert organic liquid medium. The fluorinated olefin is then contacted with the mixture until there is no further pressure change in the system. The reaction mixture is then acidified, and the desired β-alkoxypolyfluoro ester, ketone, or aldehyde is isolated by distillation or other method known to those skilled in the art.

In one embodiment, a reactor equipped with a gas-tight stirrer, condenser fitted with a manometer and a vacuum source, thermometer, and gas inlet tube is charged with carboxylic acid ester and alkali metal alkoxide. The system is evacuated and flushed with fluoroolefin at a rate such as to maintain a positive pressure on the system, while the temperature is maintained below 80° C., generally between 15° and 60° C. After reaction is complete, as evidenced by cessation of consumption of fluoroolefin, the reaction mixture is acidified, and the salt which separates is removed by filtration. The filtrate is then subjected to distillation to separate the desired β-alkoxypolyfluoroaldehyde, ester or ketone.

A critical feature of the instant process is the acidification step. The pH required varies somewhat with the starting materials and the nature of the products. In some cases, carbonic acid can be employed. An acid at least of the strength of acetic is sufficient in all cases. For ease in operation, a mineral acid, e.g., hydrochloric, sulfuric, phosphoric, hydrobromic, etc., or a sulfonic acid is generally employed. The amount of acid needed is at least equivalent to the amount of base (alkoxide) initially used.

The process by which the products of the invention are made is conducted at temperatures which do not exceed 80° C. and are generally in the range of 15° to 60° C. because under these conditions the best balance of product yield and reaction rate is realized.

Pressure is not a critical variable and may vary from below atmospheric to 400 lb./sq. in. or more. Generally, however, there is no advantage in using pressures above 200 lb./sq. in. and this value represents a practical upper pressure limit. The reaction is permitted to proceed until the system has attained essentially static pressure state under the conditions employed.

The alkali metal alkoxides employed are preferably those of sodium because of relatively low cost and availability of this metal. Suitable alkoxides are those of alcohols of up to 18 carbons and particularly useful are the alkoxides of the short chain alkanols, e.g., of up to seven carbon atoms. Illustrative of such alcohols are methanol, propanol, butanol, pentanol, tert-butyl alcohol, pentanol-2, heptanol-2, octanol, dodecanol, octadecanol, 1H,1H,3H-tetrafluoropropanol-1, 1H,1H,7H-dodecafluoroheptanol-1, 2,2,2-trifluoroethanol, 1H,1H-pentafluoropropanol-1, 1H,1H-nonafluoropentanol-1, 1H,1H,3H-hexafluorobutanol-1, 4H-tetradecafluoroheptanol-4, and the like. Obviously as functional equivalents of sodium in the alkoxides employed are the other metals, namely, lithium, potassium and cesium. As previously pointed out, these are less preferred than sodium because of their higher cost.

The alkali metal alkoxide is used in amount which is at least equimolar of the carboxylic acid ester. If desired, a larger amount can be used, but offers no advantage.

The fluoroolefin utilized corresponds to $CX_2=CX_2$, in which X is a halogen of atomic number 9 to 35, at least two of the X's being fluorine. Examples of suitable fluoroolefins are dichlorodifluoroethylene, monochlorotrifluoroethylene, monobromotrifluoroethylene, dibromodifluoroethylene, and tetrafluoroethylene. In practice the fluoroolefin is added to provide at least one mole per mole of ester employed.

Generically the reactant, other than the alkoxide and fluoroolefin, may be defined as a carboxylic compound corresponding to Z—CO—Y, in which Z is hydrogen, alkoxy or alkyl, usually of not more than 18 carbons, and Y is secondary amino, i.e., $R_2N$—, alkoxy, alkoxy carbonyl or alkoxy carbonyl alkylene of not more than 12 carbon atoms. The compounds falling within the purview of the above general formula are of three types, viz: (a) carbonate esters, (b) esters of carboxylic acids other than carbonic, and (c) carboxamides.

As illustrated by the detailed examples, when carbonates are employed the reaction proceeds to form the alkoxypolyfluoroester and the bis-beta-alkoxypolyfluoroketones, as the principal products. When esters, other than carbonates or formates are used the principal product is the alkoxypolyfluoroketone and when formamides or formates are used it is the alkoxypolyfluoroaldehyde.

In general, any ester of an aliphatic, cycloaliphatic or aromatic mono- or dicarboxylic acid can be used. The preferred esters are those of alcohols and fluoroalcohols containing not more than 18 carbons and of carboxylic acids of up to 12 carbon atoms. Examples are methyl propionate, ethyl isobutyrate, methyl laurate, dodecyl acetate, octadecyl formate, diethyl carbonate, dioctyl carbonate, butyl formate, amyl formate, diethyl succinate, dioctyl adipate, methyl cyclohexanecarboxylate, butyl benzoate, diamyl phthalate, phenyl acetate, 1H,1H-heptafluorobutyl acetate, 1H,1H,9H-hexadecafluorononyl butyrate and the like.

In the preparation of the novel aldehyde of the invention N,N-dialkylcarboxamides are generally useful, although alkyl formates can also be used. Specific operative N,N-dialkylcarboxamides include N,N-dimethylformamide, N,N-diethylformamide, and the like.

The reactions of the invention, of course, take place in the stoichiometric proportions shown by the general equations above. Thus in the formation of the β-alkoxypolyfluoro esters and aldehydes the fluoroolefin, carboxylic acid ester, and alkali metal alkoxide react in 1:1:1 molar proportions. In practice the ester can be used in amounts considerably in excess of the stoichiometrically required amounts, in which event the ester functions both as a reactant and reaction medium. In like manner, the reaction of the alkoxide, the fluoroolefin and the amide proceeds in 1:1:1 molar proportions in the synthesis of the β-alkoxypolyfluoroaldehydes. In the formation of the bis-(β-alkoxy)-polyfluoroketones the fluoroolefin, carboxylic ester, and alkali metal alkoxide react in 2:1:1 molar proportions.

When a distinct inert reaction medium is employed, it can equal or exceed the carboxylic acid ester by 10 or more fold. Suitable media are diethyl ether, tetrahydrofuran, 1,2-dimethoxyethane, and the like.

The separation of the various products from the acidified reaction mixture and from each other is readily accomplished by methods well known to those skilled in the art. Distillation, crystallization, sublimation, vapor phase chromatography, extraction in ion exchange columns, etc., can be utilized, if desired.

There follow some examples which illustrate but do not limit the monomeric aspects of the invention. In these examples, parts are by weight unless otherwise specified.

EXAMPLE I

(10) $CF_2=CF_2+NaOCH_3+OC(OCH_3)_2 \longrightarrow CH_3O(CF_2)_2-\underset{\underset{ONa}{|}}{C}-(OCH_3)_2$

(11) $CH_3O(CF_2)_2-\underset{\underset{ONa}{|}}{C}-(OCH_3)_2 \xrightarrow{H^+}$ $CH_3O(CF_2)_2-\underset{\underset{O}{\|}}{C}-OCH_3+CH_3OH+Na^+$ methyl β-alkoxytetrafluoropropionate A suspension of 108 parts of sodium methoxide in a solution of 225 parts of dimethyl carbonate and 350 parts of tetrahydrofuran was cooled to 20° C. in a one-liter, three-necked, round-bottom flask equipped with a gas-tight, true-bore stirrer, a condenser connected to an open-end manometer and to a vacuum source, a thermometer, and a gas inlet tube. After evacuating and flushing the system several times with tetrafluoroethylene, the system was evacuated, and tetrafluoroethylene was bled in at a rate which maintained a positive pressure of not more than 50 mm., while the temperature was kept below 25° C. After 4 hours, the rate of addition had decreased from 10 parts in 10 minutes to 10 parts in 40 minutes. The thick slurry which formed was treated with 200 parts of 100% sulfuric acid (1:1 mixture of concentrated and 20% fuming sulfuric acid), filtered, and the solid washed well with diethyl ether. The combined ethereal filtrates were concentrated under water vacuum at room temperature to give 410 parts of crude product. Flash distillation followed by a distillation through a 24-inch column packed with glass helices yielded 282 parts (74% of theory) of methyl β-methoxytetrafluoropropionate, B.P. 66–71° C. at 49 mm., $n_D^{25}$ 1.3371–1.3327, and 70 parts (12% of theory) of 1,5-dimethoxyperfluoro-3-pentanone, B.P. 77–78.5° C. at 49 mm., $n_D^{25}$ 1.3177.

A small sample of polyvinyl acetate was dissolved in the methyl β-methoxytetrafluoropropionate, prepared as above. The resulting solution was viscous and a film cast therefrom on glass was clear, tough, and strongly adherent to the glass.

The methyl β-methoxytetrafluoropropionate was further characterized by conversion to dimethyl difluoromalonate as follows:

A mixture of 9.5 parts of methyl β-methoxytetrafluoropropionate, 1.6 parts of methanol, and 40 parts of conc. sulfuric acid was placed in a polyethylene bottle and warmed on a steam bath. After 15 minutes, the resulting solution was stripped of volatile products under vacuum, the distillate poured into water, and then extracted with ether. The ether extract was dried over anhydrous magnesium sulfate, filtered, and concentrated to yield 7.2 parts of crude dimethyl difluoromalonate. After distillation through a spinning-band column, there was obtained 5.14 parts (71%) of dimethyl difluoromalonate; B.P. 70–72° C. at 20 mm., $n_D^{25}$ 1.3709. The infrared and n-m-r [1] spectra agreed with the structure of dimethyl difluoromalonate.

*Analysis.*—Calcd. for $C_5H_6F_2O_4$: C, 35.7; H, 3.6; F, 22.6; N.E., 84. Found: C, 35.4; H, 3.7; F, 22.1; N.E., 84.

EXAMPLE II

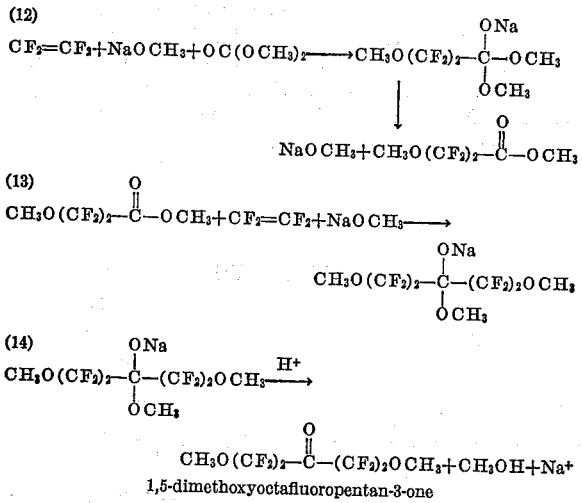

(12) $CF_2=CF_2+NaOCH_3+OC(OCH_3)_2 \longrightarrow CH_3O(CF_2)_2-\underset{\underset{OCH_3}{|}}{\overset{ONa}{\overset{|}{C}}}-OCH_3$ $\downarrow$ $NaOCH_3+CH_3O(CF_2)_2-\overset{O}{\overset{\|}{C}}-OCH_3$

(13) $CH_3O(CF_2)_2-\overset{O}{\overset{\|}{C}}-OCH_3+CF_2=CF_2+NaOCH_3 \longrightarrow$ $CH_3O(CF_2)_2-\underset{\underset{OCH_3}{|}}{\overset{ONa}{\overset{|}{C}}}-(CF_2)_2OCH_3$

(14) $CH_3O(CF_2)_2-\underset{\underset{OCH_3}{|}}{\overset{ONa}{\overset{|}{C}}}-(CF_2)_2OCH_3 \xrightarrow{H^+}$ $CH_3O(CF_2)_2-\overset{O}{\overset{\|}{C}}-(CF_2)_2OCH_3+CH_3OH+Na^+$ 1,5-dimethoxyoctafluoropentan-3-one A mixture of 10.8 parts of sodium methoxide and 60 parts of dimethyl carbonate (B.P. 90–91° C.) was placed in a 400-ml. reactor fitted with a thermocouple well and inlet tube. After evacuating and flushing with tetrafluoroethylene, agitation was started and tetrafluoroethylene was added at a rate such as to maintain the temperature at 40° C. During the first hour of addition, the pressure was below atmospheric but slowly rose to 40 lb./sq. in. after 2 hours. After 4 hours at 40 lb./sq. in. there was no more uptake of tetrafluoroethylene, and the temperature dropped to that of the room. During this time 41 parts of tetrafluoroethylene were absorbed (100% of theory).

The resulting thick slurry was taken up in ether and treated with 20 parts of 100% sulfuric acid with stirring and cooling. The precipitated sodium bisulfate was removed by filtration and thoroughly washed with ether. The combined ethereal filtrates were treated with 5 parts of sodium fluoride to remove trace amounts of hydrogen fluoride and then concentrated. Distillation through a spinning-band column at 47 mm. yielded, after a forerun of methyl alcohol and dimethyl carbonate, 48 parts of sweet-smelling oil; B.P. 68–80° C. at 47 mm. Careful fractionation through a 30-inch packed column at 11 mm. pressure yielded (1) 6.4 parts (17% of theory) of methyl β-methoxytetrafluoropropionate, B.P. 40–41° C. at 11 mm., $n_D^{25}$ 1.3358; (2) 3.2 parts intermediate fraction, B.P. 41–48° C.; and (3) 43.9 parts (75% of theory) of 1,5-dimethoxyperfluoropentan-3-one, B.P. 48° C. at 11 mm., $n_D^{25}$ 1.3168, $d_{25}^{25}$ 1.477. Total yield of ester and ketone based on sodium methoxide was 92%. Both n-m-r and infrared spectra were in agreement with these structures.

*Analysis.*—Calcd. for $C_5H_6F_4O_3$: C, 31.6; H, 3.2; F, 40.0; N.E., 190. Found: C, 31.8; H, 3.3; F, 39.7; N.E., 182.

*Analysis.*—Calcd. for $C_7H_6F_8O_3$: C, 29.0; H, 2.1; F, 52.4; N.E., 290. Found: C, 29.1; H, 2.3; F, 52.4; N.E., 281, 270.

EXAMPLE III

To a chilled mixture of 74 parts of methyl acetate and 21.6 parts of sodium methoxide there was added tetrafluoroethylene at a rate which maintained the temperature below 18° C. After 3 hours 44 parts of tetrafluoroethylene had been absorbed. The reaction mixture was poured into ice cold dilute sulfuric acid. The organic layer was dried, and then distilled through a spinning-band column to obtain 32 parts (60% of theory) of methyl tetrafluoroethyl ether, B.P. 35–36° C., $n_D^{25}$ 1.265, $d_{25}^{25}$ 1.25; 31 parts (22%) of β-methoxytetrafluoroethyl methyl ketone, B.P. 79–81° C., $n_D^{25}$ 1.3378; and a high boiling residue which contained 43% F. The infrared and n-m-r spectra of the ketone were in agreement with the structure of 4-methoxy-3,3,4,4-tetrafluoro-2-butanone with carbonyl absorption at 5.66 μ.

The ketone was further characterized by conversion to a 2,4-dinitrophenylhydrazone, M.P. 76.5–77° C. (recryst. from 95% ethanol).

*Analysis.*—Calcd. for $C_{11}H_{10}F_4N_4O_5$: C, 37.3; H, 2.8; F, 21.5; N, 15.8. Found: C, 37.8; H, 2.8; F, 21.2; N, 15.4, 15.5.

EXAMPLE IV

To 21.6 parts of sodium methoxide suspended in 136 parts of methyl benzoate, tetrafluoroethylene was added with shaking at 40 lb./sq. in. while warming to 52° C. The addition of 40.2 parts of tetrafluoroethylene required 5 hours. To the thick slurry which formed, there was added 100 ml. of 6 N sulfuric acid with vigorous shaking. The organic layer was separated and distilled in a short path still under high vacuum. After heating to 250° C. at 0.1 mm. pressure, there remained a considerable amount of undistilled viscous oil which contained 34.05% of F. The distillate was taken up in ether and extracted with sodium bicarbonate. Concentration in vacuo gave 142 parts of an oil which was distilled through a precision fractionation column to give 95.8 parts of methyl benzoate, B.P. 75–78.5° C. at 7 mm.; $n_D^{25}$ 1.5140, and 6.8 parts of β-methoxytetrafluoropropiophenone, B.P. 94–96° C. at 8 mm.; $n_D^{25}$ 1.4330. There was also obtained 28.6 parts of higher boiling, unidentified oils which contained 40.8 to 36.1% of fluorine. The infrared and n-m-r spectra of the ketone fraction agreed with the assigned structure.

---

[1] Nuclear magnetic resonance.

*Analysis.*—Calcd. for $C_{10}H_8F_4O_2$: C, 50.9; H, 3.4; F, 32.2. Found: C, 51.2; H, 3.9; F, 31.8.

EXAMPLE V

A mixture of 6.75 parts of sodium methoxide, 14.6 parts of diethyl oxalate, 17.5 parts of tetrahydrofuran, and 29.3 parts of tetrafluoroethylene was warmed slowly to 50° C. A maximum pressure of 400 lb./sq. in. was developed. The reaction appeared to have been completed during the warmup period as there was no further pressure drop at 50° C., even after 8 hours. The viscous solution was poured into cold aqueous 2 N sulfuric acid and extracted with methylene chloride. The organic extracts were dried over magnesium sulfate, concentrated, and flash distilled. The bulk of the product was quite volatile, with a 2-part viscous fraction boiling above 120° C. at 0.01 mm. The more volatile fractions were combined and distilled through a spinning-band column to give 18.1 parts of oil; B.P. 64–71° C. at 8–10 mm.; $n_D^{21.5}$ 1.3723. The crude material was redistilled twice from phosphorus pentoxide through a spinning-band column to give a series of fractions; B.P. 66–71° C. at 8 mm.; $n_D^{21.5}$ 1.3611–1.3635. Infrared and nuclear magnetic resonance spectral analyses showed this to be a mixture of methyl and ethyl esters of α-keto- γ-alkoxy-tetrafluorobutanoic acid, where alkoxy is ethoxy and methoxy. A middle fraction (B.P. 67–68° C., $n_D^{21.5}$ 1.3622) analyzed for a mixture where the ratio of methyl to ethyl was 1:1.

*Analysis.*—Calcd. for $C_7H_8F_4O_4$: C, 36.2; H, 3.5; F, 32.8; N.E., 232. Found: C, 37.6; H, 2.7; F, 29.9 31.1, 30.4; N.E. in ethanol, 232.

The saponification equivalent was 115 or one half the neutral equivalent, further confirming the assigned structure.

The alkyl α-keto- γ-alkoxytetrafluorobutanoates were further characterized by conversion to α-ketodifluorosuccinic acid as follows:

The above experiment was repeated at 40° C. for 2 hours. The viscous reation mixture was poured into 2 N sulfuric acid and extracted with methylene chloride. Concentration of the organic extracts gave an oil which was refluxed overnight with 10% sulfuric acid. The initially insoluble oil had gone into solution accompanied by considerable etching of the glass flask. The strongly acid solution was extracted continuously with ether overnight. Drying and concentrating the ether extract gave a viscous fuming liquid which now contained only one peak in the nuclear magnetic fluorine resonance spectrum. Taking the syrup up in hot trifluoroacetic acid, followed by cooling, gave 8.7 parts of white, very hygroscopic crystals; M.P. 113–116° C. Sublimation raised the melting point to 115–116° C. (in a sealed capillary). Infrared and nuclear magnetic resonance spectral analyses characterized this solid as the α-ketodifluorosuccinic acid. Elemental analyses were complicated by the extremely hygroscopic character of the acid.

*Analysis.*—Calcd. For $C_4H_2F_2O_5$: C, 28.6; H, 1.2; F, 22.6; N.E., 84. Found: C, 26.9; H, 2.0; F, 21.2; N.E., 177 ($K_1$), 88 ($K_2$).

EXAMPLE VI

To a suspension of 4.8 parts of sodium hydride in 130 parts of tetrahydrofuran was added 46.4 parts of 1H,1H, 5H-octafluoro-1-pentanol. After the initial vigorous evolution of gas had ceased, the mixture was refluxed for one hour until all the sodium hydride had reacted. The resulting mixture was filtered to give a clear solution of the sodium alkoxide. Excess dimethyl carbonate (30 parts) was added to the solution followed by tetrafluoroethylene. The system was maintained below 40° C. After 3 hours, no more tetrafluoroethylene absorption occurred at 40 lb./sq. in. The orange reaction mixture was treated with 22 parts of concentrated sulfuric acid and 140 parts of diethyl ether. Filtration of the inorganic salts and concentration gave a yellow oil which fumed in air. A flash distillation, followed by a fractional distillation, indicated two main boiling ranges; 81–108° C. at 10 mm. and 94–101° C. at 0.3 mm. The entire distillate was treated with separate portions of sodium fluoride and phosphorus pentoxide. Redistillation through a precision fractionation column at 8 mm. gave three main fractions—A, B, and C.

Fraction C consisted of 15.9 parts of bis[β-(1H,1H, 5H - octafluoroamyloxy)tetrafluoroethyl]ketone, B.P. 128–131° C. at 8 mm.; $n_D^{25}$ 1.3189. The infrared spectra contained a strong carbonyl absorption at 5.56μ, and proton and fluorine nuclear magnetic resonance spectra agreed with the assigned structure.

*Analysis.*—Calcd. for $C_{15}H_6F_{24}O_3$: C, 26.1; H, 0.9; F, 66.1. Found: C, 26.6; H, 1.1; F, 66.6.

The ketone readily dissolved in ethanol to form an ethyl hemiketal which could be titrated with aqueous base to give a neutral equivalent of 684 for the ketone (theory is 690). The $pK_a$ of the hemiketal was 9.6. This ketone can be distilled at atmospheric pressure at 278° C. without noticeable decomposition and is useful as a heat-transfer fluid.

Fraction B consisted of 4.8 parts of 1-methoxy-5-(1H, 1H,5H-octafluoroamyloxy)octafluoro - 3 - pentanone, B.P. 92–96° C. at 8 mm.; $n_D^{25}$=1.3190. The infrared spectra exhibited a strong carbonyl absorption at 5.57μ. The proton and fluorine nuclear magnetic spectra agreed with the assigned structure.

*Analysis.*—Calcd. for $C_{11}H_6F_{16}O_3$: C, 26.9; H, 1.2; F, 62.0. Found: C, 27.3; H, 1.3; F, 61.6.

In a manner similar to Fraction C ketone, the 1-methoxy - 5-(1H,1H,5H-octafluoroamyloxy)octafluoro-3-pentanone dissolved in ethanol to form a titratable hemiketal. The neutral equivalent of the ketone was thus determined to be 495 as compared to the theroretical value of 490. The $pK_a$ was likewise 9.6.

Fraction A consisted of 7.5 parts of oil, B.P. 83–90° C. at 8 mm.; $n_D^{25}$ 1.3210. Infrared and nuclear magnetic resonance spectral analyses indicated this to be a 2:1 mixture of 1-methoxy-5-(1H,1H,5H-octafluoroamyloxy) octafluoro-3-pentanone and a component which contained one less —$CF_2CF_2$— grouping.

EXAMPLE VII

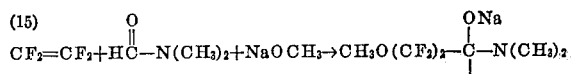

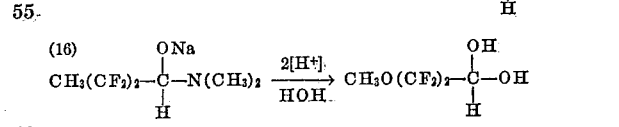

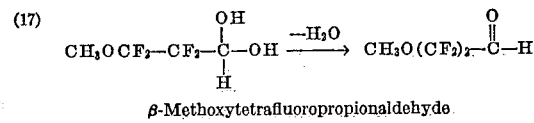

β-Methoxytetrafluoropropionaldehyde

A mixture of 110 parts of dimethylformamide, 54 parts of sodium methoxide, and 175 parts of tetrahydrofuran was placed in a 1-liter, three-neck flask equipped with a stirrer, thermometer, and reflux condenser, which was connected to an open-end manometer and a source of tetrafluoroethylene. The system was evacuated, flushed three times with tetrafluoroethylene, and the stirrer was started. The pressure was maintained at just below atmospheric pressure by a slow bleed of tetrafluoroethylene, and the temperature was kept below 30° C. by cooling in a cold water bath. In this manner a total of 92 parts of tetrafluoroethylene was added over a 2-hour period, with the initial 90% being added during the first 40 minutes.

The resulting cloudy viscous solution was treated with 65 parts of methanol and then poured into a mixture of 200 parts of concentrated sulfuric acid and 600 parts of ice. After stirring for 20 minutes, the chilled solution was extracted with three 150-part portions of diethyl ether. The ethereal solution, which contained the hemiacetal of β-methoxytetrafluoropropionaldehyde, was dried over anhydrous calcium sulfate and concentrated to a low volume by distillation through a 30-cm. packed column. The concentrate was then cautiously treated with an excess of phosphorus pentoxide. The volatile material was removed under vacuum, while heating on a steam bath. Two distillations off fresh phosphorus pentoxide gave 53 parts of crude β-methoxytetrafluoropropionaldehyde (B.P. 77–84° C.), accompanied by extensive fuming and decomposition. Redistillation from fresh phosphorus pentoxide gave 36 parts (23% of theory) of the aldehyde, B.P. 83–85.5° C. A center cut was analyzed.

*Analysis.*—Calcd. for $C_4H_4F_4O_2$: C, 30.0; H, 2.5; F, 47.5. Found: C, 30.8; H, 2.9; F, 47.4.

In another experiment diethyl ether was used as the medium in place of tetrahydrofuran. Starting with 54 parts (1.0 mole) of sodium methoxide, 73 parts (1.0 mole) of dimethylformamide, and 70 parts of diethyl ether, 90 parts (90% of theory) of tetrafluoroethylene was added in the same manner as described above at 25–28° C. The volatile materials were removed under vacuum into a trap cooled in solid carbon dioxide and then distilled through a low temperature still. In this manner there was obtained 39 parts of methyl trifluorovinyl ether, B.P. 10–15° C. as identified by infrared spectral analysis.

After removal of the methyl trifluorovinyl ether, the reaction mixture was dissolved in 200 parts of water and 500 parts of 6 N hydrochloric acid was added. The aqueous mixture was extracted six times with a total of 280 parts of diethyl ether. The combined ethereal solutions, which contained the hydrate of β-methoxytetrafluoropropionaldehyde, were concentrated and then cautiously added to 150 parts of phosphorus pentoxide with swirling and stirring. The resulting mixture was refluxed for one-half hour on a steam bath, and the volatile material was removed in vacuo into a trap cooled in solid carbon dioxide. The product was then distilled from phosphorus pentoxide to give 47 parts of β-methoxytetrafluoropropionaldehyde, B.P. 83.5–85.5° C. After sitting overnight at room temperature, the purest fraction of the aldehyde (B.P. 85.5° C.) had polymerized spontaneously to a white solid melting at 160–180° C. with an initial softening at 130° C. The other fractions also polymerized upon standing but more slowly.

The aldehyde function was confirmed by forming a 2,4-dinitrophenylhydrazone and a semicarbazone. The 2,4-dinitrophenylhydrazone was recrystallized from 90% alcohol-water to constant melting point. The yellow needles (M.P. 112–112.5° C.) had an ultraviolet maximum at 3380 A. (log ε=4.33).

*Analysis.*—Calcd. for $C_{10}H_7F_4N_4O_5$: C, 35.4; H, 2.1; F, 22.4; N, 16.5. Found: C, 35.9, 36.1; H, 2.3; F, 21.8; N, 16.5.

The semicarbazone was likewise prepared from semicarbazide hydrochloride and sodium acetate. The crude semicarbazone melted from 100–121° C. The pure semicarbazone was obtained after eight recrystallizations from absolute ethanol. The resulting white platelets were waxy in appearance and melted at 168.5–169° C., after an initial crystalline modification melted at 155–157° C. The once-melted material remelted sharply at 168–169° C.

*Analysis.*—Calcd. for $C_5H_7F_4N_3O_2$: C, 27.7; H, 3.3; F, 35.0; N, 19.4. Found: C, 28.1; H, 3.3; F, 35.0; N, 19.3.

The β-methoxytetrafluoropropionaldehyde readily formed a hydrate (M.P. 82–84° C.) and a methyl hemiketal, both of which were crystalline solids when pure.

EXAMPLE VIII

A mixture of 27 parts of sodium methoxide, 72 parts of dimethyl carbonate, and 66 parts of tetrahydrofuran was charged into a pressure reactor, which was then mounted on a shaker machine. After flushing the system, chlorotrifluoroethylene was introduced slowly, while the reactor was shaken and the pressure raised to 42 lb./sq. in. at 40° to 43° C. These conditions were maintained for 5½ hours. The reaction mixture was acidified with cold dilute sulfuric acid, and the product extracted into ether, dried, concentrated and distilled. There was obtained 4.9% of methyl α-chloro-β-methoxytrifluoropropionate, B.P. 84° C. at 47 mm., $n_D^{23}$ 1.3763, and 41.9% 1-chloro-2-methoxy-1,2-difluoroethylene, B.P. 57° to 59° C. The ester analyzed:

*Analysis.*—Calcd. for $C_5H_6O_3ClF_3$: C, 29.1; H, 2.9; Cl, 17.2; F, 27.6. Found: C, 29.7; H, 3.2; Cl, 17.0; F, 27.6.

A mixture of 6.0 parts of the methyl α-chloro-β-methoxytrifluoropropionate, prepared as above, 24 parts of concentrated sulfuric acid, 1 part of water, and 1.2 parts of methanol was heated for 20 minutes on a steam bath. Volatile material consisting of 1.1 parts of liquid, $n_D^{25}$ 1.4081, was removed by distillation. This product was mixed with 5 parts of aniline and the resulting solution was allowed to stand overnight at ambient temperature. About 50 parts of water was added directly to the solution and the excess aniline was removed by steam distillation. Filtration of the steam-distilled residue gave 0.8 part of air-dried solid, M.P. 165–172° C., which was crystallized from benzene and then from a benzene-hexane mixture. The product melted at 177–178° C. and infrared analysis was in agreement with the structure of chlorofluoromalonodianilide.

*Calculated.*—For $C_{15}H_{12}O_2N_2ClF$: C, 58.7; H, 3.9; N, 9.1; Cl, 11.6; F, 6.2. Found: C, 58.9; H, 4.0; Cl, 11.3; F, 6.6; N, 9.1.

EXAMPLE IX

Example VIII was repeated except that the tetrahydrofuran was replaced by 50 parts of dimethyl carbonate, the pressure and temperature were adjusted to 40 lb./sq. in. and 35° to 45° C. respectively and the reaction time was 6 hours. There was obtained a product which yielded 19.7% of methyl α-chloro-β-methoxytrifluoropropionate and 61.6% of 1-chloro-2-methoxy-1,2-difluoroethylene.

EXAMPLE X

Tetrafluoroethylene was added at 30 to 40 lb./sq. in. and 40° C. over a 9-hour reaction period to a reaction mixture containing 112 parts of bis(1H,1H,5H-octafluoro)-amyl carbonate, 44 parts of tetrahydrofuran, and 74.5 parts of an ether solution containing 63.3 parts of sodium 1H,1H,5H-octafluoroamylate. The mixture was poured over ice and acidified with hydrochloric acid. The product which separated was removed and the aqueous portion extracted with diethyl ether. The ether extract and liquid product were combined, washed with water, dried over anhydrous calcium sulfate, and distilled. After removal of unreacted 1H,1H,5H-octafluoroamyl alcohol, there was obtained 54.9 parts of colorless liquid, B.P. 85° to 87° C./0.5 mm., $n_D^{24}$ 1.3181. Infrared, refractive index, and n-m-r spectra showed the product to be bis[β-(1H,1H,5H-octafluoroamyloxy)tetrafluoroethyl] ketone.

In addition to the disclosure of the examples detailed above, the following table shows other reactants and products in accordance with the invention:

Ethers such as diethyl ether, alkanes of the $C_5$ to $C_{10}$ range, cycloalkanes, and the like are suitable media.

Table

| Fluoroolefin | Alkoxide | Ester or Amide | Product |
|---|---|---|---|
| $CF_2=CF_2$ | $NaOC_{12}H_{25}$ | $CH_3COOC_{12}H_{25}$ | $C_{12}H_{25}O(CF_2)_2-\overset{O}{\overset{\|}{C}}-CH_3$ |
| $CF_2=CF_2$ | $NaOC_{18}H_{37}$ | $OC(OC_{18}H_{37})_2$ | $C_{18}H_{37}O(CF_2)_2-\overset{O}{\overset{\|}{C}}-OC_{18}H_{37}$ |
| $CF_2=CF_2$ | $NaOC_8H_{17}$ | $OC(OC_8H_{17})_2$ | $C_8H_{17}O(CF_2)_2-\overset{O}{\overset{\|}{C}}(CF_2)_2OC_8H_{17}$ |
| $CF_2=CF_2$ | $NaOCH_2(CF_2)_2CF_3$ | $CH_3\overset{O}{\overset{\|}{C}}-OCH_2(CF_2)_2CF_3$ | $CF_3(CF_2)_2CH_2O(CF_2)_2-\overset{O}{\overset{\|}{C}}-CH_3$ |
| $CF_2=CF_2$ | $NaOCH_2(CF_2)_8H$ | $CH_3(CH_2)_2COOCH_2(CF_2)_8H$ | $H(CF_2)_8CH_2O(CF_2)_2-\overset{O}{\overset{\|}{C}}(CH_2)_2CH_3$ |
| $CF_2=CF_2$ | $NaOCH_2-CF_2-CHF_2$ | $H-\overset{O}{\overset{\|}{C}}-N(C_2H_5)_2$ | $CF_2-CHFCF_2-CH_2O(CF_2)_2-\overset{O}{\overset{\|}{C}}-H$ |

The monomeric β-alkoxypolyfluoroaldehydes, ketones and esters are in general colorless liquids to solids with melting and boiling points increasing with their molecular weight. The liquids, and the normal solids at elevated temperature, are good organic solvents and are therefore useful as reaction media involving reactants difficultly soluble in conventional reaction media. They are also useful as solvents in casting polymeric films (see Example I). Some also offer utility in conventional stable liquid outlets, e.g., as brake fluids and the like.

The novel β-alkoxypolyfluoroaldehydes of this invention are generically polymerizable and hence are precursors of both homopolymers and copolymers, themselves useful in the production of films, fibers, bristles and the like. Polymerization is conveniently effected by introducing monomeric β-alkoxypolyfluoroaldehyde into an agitated inert reaction medium containing an anionic initiator and maintained at a temperature below 0° C. Polymer separates and is recovered by filtration or other method known to those skilled in the art.

Suitable comonomers for copolymerization with the β-alkoxypolyfluoroaldehydes of this invention include thiocarbonyl difluoride, carboxaldehydes, polyfluoroaldehydes, etc.

Polymerization of the compounds of the invention is illustrated in the following example (note also Example VII).

EXAMPLE A

Samples of distilled β-methoxytetrafluoropropionaldehyde (1.5 ml.), prepared as in Example VII, were purified by gas chromatography on a 12′ x ¾″ column of a silicone oil supported on firebrick and heated to 140° C. Helium flow rates were about 500 ml. per minute. The samples were collected in traps suitable for polymerization experiments by cooling with solid carbon dioxide. After the aldehyde had been collected, 2.0 ml. of sodium-dried ether was introduced into the trap by means of a hypodermic syringe. Then ca. 0.05 cc. of catalyst was added. Among the catalysts which initiated polymerization at −80° were α-toluenethiol sodium salt, triphenyl phosphine, triethyl phosphite, pyridine, and piperidine. The polymers formed in the ether solution were insoluble. They were washed with petroleum ether and could be pressed into self-supporting films at 90° C. These films are useful as wrapping foils and in similar applications.

The polymerization of the β-alkoxypolyfluoroaldehydes is effected in a reaction medium which, preferably, is a nonsolvent for the polymer but is a solvent for the monomer. The medium is also one which remains liquid under the temperature conditions used in the polymerization.

The amount of reaction medium can be from 1.5 to 1000 or more times the weight of the monomeric β-alkoxypolyfluoroaldehyde depending upon whether the polymerization is being carried out by a batch or continuous method.

The polymerization is effected with anionic initiators. Examples of such are dimethylformamide, trihydrocarbon phosphines, stibines, and arsines of the type disclosed in U.S. 2,768,994; the onium salts, including quaternary ammonium salts and quaternary phosphonium salts disclosed in the application of H. H. Goodman et al., U.S. Serial No. 521,878, filed July 13, 1955; and alkyl phosphites, etc.

The amount of catalyst can vary from 0.1% to about 10% or more by weight of the monomeric β-alkoxypolyfluoroaldehyde. In general good results are obtained when the catalyst concentration is from 1% to 5% by weight of the monomeric β-alkoxyfluoroaldehyde.

The polymerization of the β-alkoxypolyfluoroaldehyde is effected at temperatures which can be as low as the freezing point of the reaction medium or as high as 30° C. As a rule the best results from the standpoint of polymer quality and reaction rate are realized at temperatures in the range of −80° C. to −30° C. and the polymerization is usually carried out within this temperature range.

Since obvious modifications in the invention will be evident to those skilled in the chemical arts, I propose to be bound solely by the appended claims.

The embodiments of the invention in which an exclusive property or privilege is claimed are defined as follows:

1. The process which comprises sequentially (1) contacting, at a temperature of about 15–80° C., a fluoroolefin of the formula $CX_2=CX_2$, wherein X is halogen of atomic number 9 to 35, at least two X's being fluorine, with a liquid reaction mixture of an alkali metal alkoxide containing up to 18 carbon atoms and a member of the group consisting of carboxylic acid esters of saturated alcohols and fluoroalcohols containing up to 18 carbon atoms and carboxylic acids containing up to 12 carbon atoms and N,N-dialkyl carboxamides; (2) acidifying said liquid reaction mixture, and (3) separating from the reaction mixture a member of the group consisting of β-alkoxypolyfluorocarboxylic acid esters, β-alkoxypolyfluoroaldehydes and β-alkoxypolyfluoroketones.

2. The process of claim 1 in which the contact temperature of the fluoroolefin and the liquid reaction mixture is about 15–60° C.

3. The process which comprises (1) contacting, at a temperature of about 15–80° C., a fluoroolefin of the formula $CX_2=CX_2$, wherein X is halogen of atomic number 9 to 35, at least two X's being fluorine, with a liquid reaction mixture comprising at least equimolar quantities of an alkali metal alkoxide containing up to 18 carbon atoms and a member of the group consisting of carboxylic acid esters of saturated alcohols and fluoroalcohols containing up to 18 carbon atoms and carboxylic acids containing up to 12 carbon atoms and N,N-dialkyl carboxamides, (2) acidifying said reaction mixture, and (3) thereby producing at least one member of the group consisting of β-alkoxypolyfluorocarboxylic acid esters, β-alkoxypolyfluoroaldehydes and β-alkoxypolyfluoroketones.

4. The process of claim 3 in which the fluoroolefin is contacted with the liquid reaction mixture until absorption thereof substantially ceases.

5. The process of claim 4 in which the contact temperature of the fluoroolefin and the liquid reaction mixture is about 15–60° C.

6. The process which comprises sequentially (1) contacting an alkali metal methoxide and dimethyl carbonate, in admixture in liquid phase and at a temperature of about 15–80° C., with tetrafluoroethylene, (2) acidifying the resultant reaction mixture, and (3) subsequently separating at least one member of the group consisting of methyl β-methoxytetrafluoropropionate and 1,5-dimethoxyperfluoro-3-pentanone therefrom.

7. The process which comprises sequentially (1) contacting an alkali metal methoxide and methyl acetate, in admixture in liquid phase and at a temperature of not more than about 80° C., with tetrafluoroethylene, (2) acidifying the resultant reaction mixture, and (3) subsequently separating β-methoxytetrafluoroethyl methyl ketone therefrom.

8. The process which comprises sequentially (1) contacting an alkali metal methoxide and methyl benzoate, in admixture in liquid phase and at a temperature of about 15–80° C., with tetrafluoroethylene, (2) acidifying the resultant reaction mixture and (3) subsequently separating β-methoxytetrafluoropropiophenone therefrom.

9. The process which comprises sequentially (1) contacting an alkali metal methoxide and diethyl oxalate, in admixture in liquid phase and at a temperature of about 15–80° C., with tetrafluoroethylene, (2) acidifying the resultant reaction mixture, and (3) subsequently separating an ester of α-keto-γ-alkoxytetrafluorobutanoic acid, alkoxy being a member of the group consisting of methoxy and ethoxy, therefrom.

10. The process which comprises sequentially (1) contacting an alkali metal alkoxide of 1H,1H,5H-octafluoro-1-pentanol and dimethyl carbonate, in admixture in liquid phase and at a temperature of about 15–80° C., with tetrafluoroethylene, (2) acidifying the resultant reaction mixture, and (3) subsequently separating at least one member of the group consisting of bis[β-(1H,1H,5H-octafluoroamyloxy)tetrafluoroethyl]ketone and 1-methoxy-5-(1H,1H,5H-octafluoroamyloxy)octafluoro-3-pentanone therefrom.

11. The process which comprises sequentially (1) contacting an alkali metal methoxide and dimethylformamide, in admixture in liquid phase and at a temperature of about 15–80° C., with tetrafluoroethylene, (2) acidifying the resultant reaction mixture, and (3) subsequently recovering β-methoxytetrafluoropropionaldehyde therefrom.

12. In the preparation of a member of the group consisting of β-alkoxypolyfluorocarboxylic acid esters, β-alkoxypolyfluoroaldehydes and β-alkoxypolyfluoroketones, the sequential steps of (1) contacting an alkali metal alkoxide containing up to 18 carbon atoms and a member of the group consisting of carboxylic acid esters of saturated alcohols and fluoroalcohols containing up to 18 carbon atoms and carboxylic acids containing up to 12 carbon atoms and N,N-dialkyl carboxamides, in admixture in liquid phase and at a temperature of about 15–80° C., with a fluoroolefin of the formula $CX_2=CX_2$, wherein X is halogen of atomic number 9 to 35, at least two X's being fluorine, and (2) subsequently acidifying the resultant reaction mixture.

13. A compound of the formula $ROCF_2CX_2COA$, wherein R is a member of the group consisting of hydrocarbon and fluorocarbon containing up to 18 carbon atoms, X is halogen of atomic number 9 to 35, and A is a member of the group consisting of hydrogen and saturated hydrocarbon and fluorocarbon containing up to 12 carbon atoms.

14. 1,5-dimethoxyperfluoro-3-pentanone.

15. 4-methoxy-3,3,4,4-tetrafluoro-2-butanone.

16. β-Methoxytetrafluoropropiophenone.

17. Bis[β-(1H,1H,5H-octafluoroamyloxy)tetrafluoroethyl]ketone.

18. 1-methoxy-5-(1H,1H,5H-octafluoroamyloxy)octafluoro-3-pentanone.

19. β-Methoxytetrafluoropropionaldehyde.

20. A polymer of a compound of claim 13 wherein A is hydrogen.

21. A polymer of β-methoxytetrafluoropropionaldehyde.

22. The polymer of claim 20 in the form of a film.

23. The process which comprises contacting a compound of claim 13 wherein A is hydrogen in an inert liquid medium with an anionic polymerization initiator at a temperature between about minus 80° C. and plus 30° C. and thereby polymerizing said compound.

References Cited in the file of this patent

UNITED STATES PATENTS 2,411,158    Hanford _____ Nov. 19, 1946

UNITED STATES PATENT OFFICE
CERTIFICATE OF CORRECTION

Patent No. 2,988,537                                         June 13, 1961

Douglas W. Wiley

It is hereby certified that error appears in the above numbered patent requiring correction and that the said Letters Patent should read as corrected below.

Column 13, lines 29 and 30, for "not more than about 80° C." read -- about 15-80° C. --.

Signed and sealed this 19th day of December 1961.

(SEAL)
Attest:

ERNEST W. SWIDER
Attesting Officer

DAVID L. LADD
Commissioner of Patents

USCOMM-DC